(12) United States Patent
Putrevu et al.

(10) Patent No.: US 9,639,506 B2
(45) Date of Patent: May 2, 2017

(54) INTERFACE FOR HOME ENERGY MANAGER

(75) Inventors: Sriharsha Putrevu, Maple Grove, MN (US); Joseph Vargas, Morristown, NJ (US); Paul Derby, Lubbock, TX (US); Pallavi Dharwada, Minneapolis, MN (US); Hari Thiruvengada, Plymouth, MN (US); John Beane, Shoreview, MN (US); Soumitri N. Kolavennu, Blaine, MN (US)

(73) Assignee: Honeywell International Inc., Morris Plains, NJ (US)

( * ) Notice: Subject to any disclaimer, the term of this patent is extended or adjusted under 35 U.S.C. 154(b) by 428 days.

(21) Appl. No.: 13/543,145

(22) Filed: Jul. 6, 2012

(65) Prior Publication Data

US 2013/0113822 A1    May 9, 2013

Related U.S. Application Data

(60) Provisional application No. 61/505,439, filed on Jul. 7, 2011.

(51) Int. Cl.
| | |
|---|---|
| *G06F 17/21* | (2006.01) |
| *G09G 5/00* | (2006.01) |
| *G06F 3/0481* | (2013.01) |
| *G05B 15/02* | (2006.01) |
| *H04L 12/28* | (2006.01) |
| *G06F 3/0488* | (2013.01) |
| *G06F 3/041* | (2006.01) |

(52) U.S. Cl.
CPC ............ *G06F 17/211* (2013.01); *G05B 15/02* (2013.01); *G06F 3/04817* (2013.01); *G06F 17/212* (2013.01); *G09G 5/00* (2013.01); *H04L 12/282* (2013.01); *H04L 12/2809* (2013.01); *G06F 3/041* (2013.01); *G06F 3/0488* (2013.01)

(58) Field of Classification Search
CPC .. G06F 3/04817; G06F 3/0488; G06F 17/212; G06F 17/211
USPC ......................................... 715/764; 345/173
See application file for complete search history.

(56) References Cited

U.S. PATENT DOCUMENTS

| | | | | |
|---|---|---|---|---|
| 6,390,371 | B1 * | 5/2002 | Armga et al. | ........... 235/472.01 |
| 2009/0100361 | A1 * | 4/2009 | Abello | ................. H04N 5/4403 |
| | | | | 715/764 |
| 2009/0172587 | A1 * | 7/2009 | Carlisle et al. | ............... 715/781 |
| 2009/0222766 | A1 * | 9/2009 | Chae | .................... G06F 3/04817 |
| | | | | 715/835 |
| 2010/0023865 | A1 * | 1/2010 | Fulker et al. | .................. 715/734 |
| 2010/0088634 | A1 * | 4/2010 | Tsuruta et al. | ................ 715/800 |
| 2010/0138295 | A1 * | 6/2010 | Caron et al. | ............... 705/14.49 |

\* cited by examiner

*Primary Examiner* — Michelle L Sams
(74) *Attorney, Agent, or Firm* — Schwegman Lundberg & Woessner, P.A.

(57) ABSTRACT

A device includes a device manager stored on a computer readable storage device. A display has multiple tiles corresponding to smart devices installed in a user home having inter-dependent statuses and settings. The device manager generates the tiles with corresponding smart device information displayed in the tiles, and selection of a tile provides a view showing details about the smart device while not obscuring unselected tiles.

20 Claims, 15 Drawing Sheets

INTERFACE FOR HOME ENERGY MANAGER

RELATED APPLICATION

This application claims priority to U.S. Provisional Application Ser. No. 61/505,439 (entitled INTERFACE FOR HOME ENERGY MANAGER, filed Jul. 7, 2011) which is incorporated herein by reference in its entirety.

BACKGROUND

Use of appliances and devices has become an integral part of many people's homes which places considerable load on the electric grid. The influx of compatible "smart" devices has the ability to form a home ecosystem that can be managed and maintained. This multi device ecosystem has inter-dependent statuses and settings that need constant monitoring and changing for an efficient energy use.

SUMMARY

A device includes a device manager stored on a computer readable storage device. A display has multiple tiles corresponding to information and data panels and smart devices installed in a user home having inter-dependent statuses and settings. The device manager generates the tiles with corresponding smart device information displayed in the tiles, and selection of a tile provides a view showing details about the smart device while not obscuring unselected tiles.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, cloud based environment, tablet, smart phone, or other computer system.

Use of appliances and devices has become an integral part of many people's homes which places considerable load on the electric grid. The influx of compatible "smart" devices has the ability to form a home ecosystem that can be automated, managed and maintained. This multi device ecosystem has inter-dependent statuses and settings that need constant monitoring and changing for efficient energy use.

Figure 1:
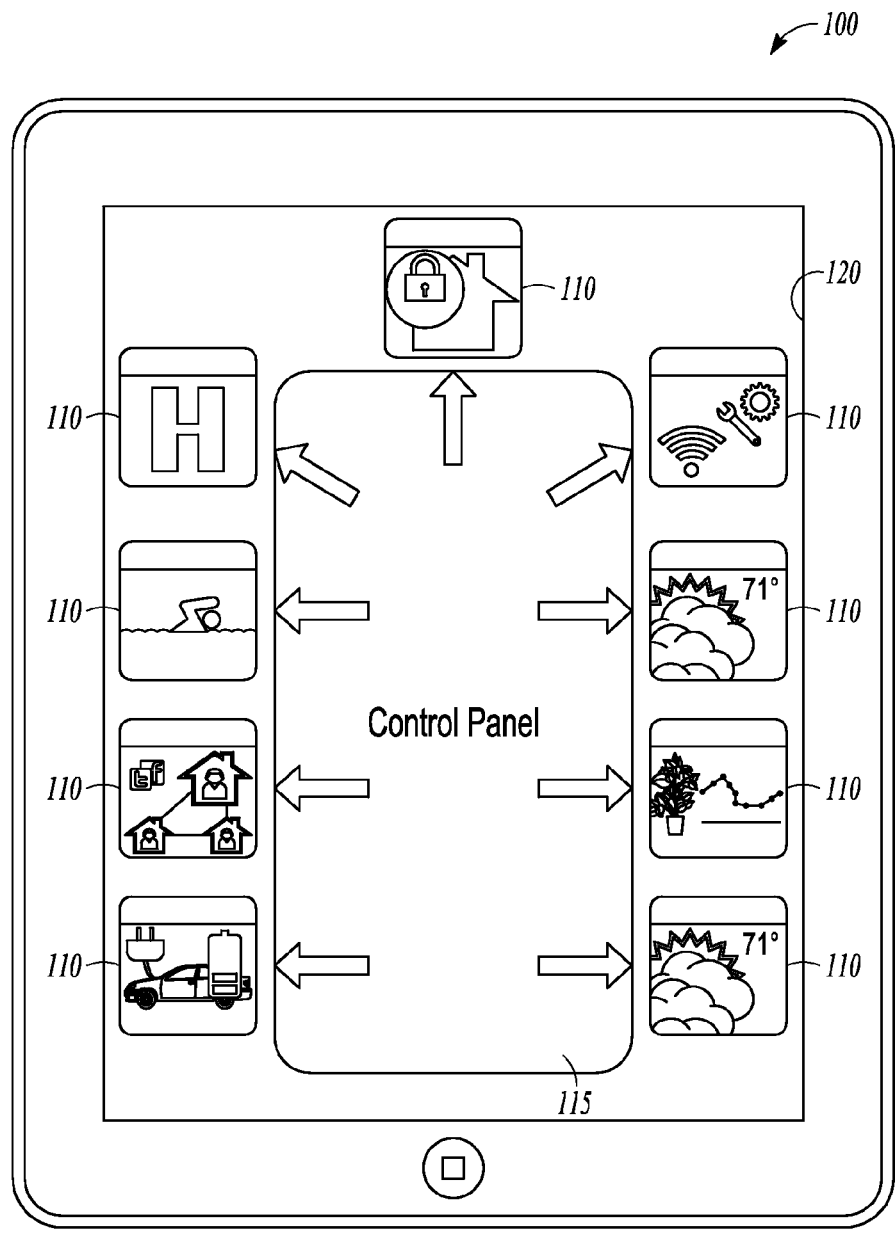
FIG. 1 illustrates a device to provide an interface for a home energy manager multi-device ecosystem, showing tiles arranged about a control panel portion of a display according to an example embodiment.

FIG. 1 illustrates a device 100 to provide an interface for a home energy manager multi-device ecosystem, showing tiles 110 arranged about a control panel portion 115 of a display 120 according to an example embodiment. The particular example screen shown is a result of a touched or opened tile having been selected by a user. A home energy manger (HEM) integrates all the devices into one user interface (UI) system by displaying them in the form of tiles 110. This makes the HEM interface complex with lots of tiles and manipulating one tile might require information or status of other tiles. This highlights the need for a navigation solution that will help getting multiple pieces of information at the same time. HEM system provides the capability to navigate between different tiles and open a detailed screen (control panel) to view and modify additional settings and information that is not displayed on the tile.

Described below is a navigation paradigm that will help users easily access and have all the critical information needed in decision making to save energy.

In one embodiment, a dashboard is provided with tiles 110 are arranged in a grid structure around a perimeter of the control panel portion 115. The size of the tiles may be selected in one embodiment such that all or most of the tiles are visible on one display 120 without the need to scroll to see other tiles, and without the tiles obscuring the control panel. If all the tiles are not visible at the same time because more devices or other types of tiles have been added, then the tiles may be arranged by frequency of use, user preference (custom order), alphabetical order or tiles that have pertinent information to make changes to the current control panel. This order may further be dictated by user choices and system intelligence.

Figure 2:
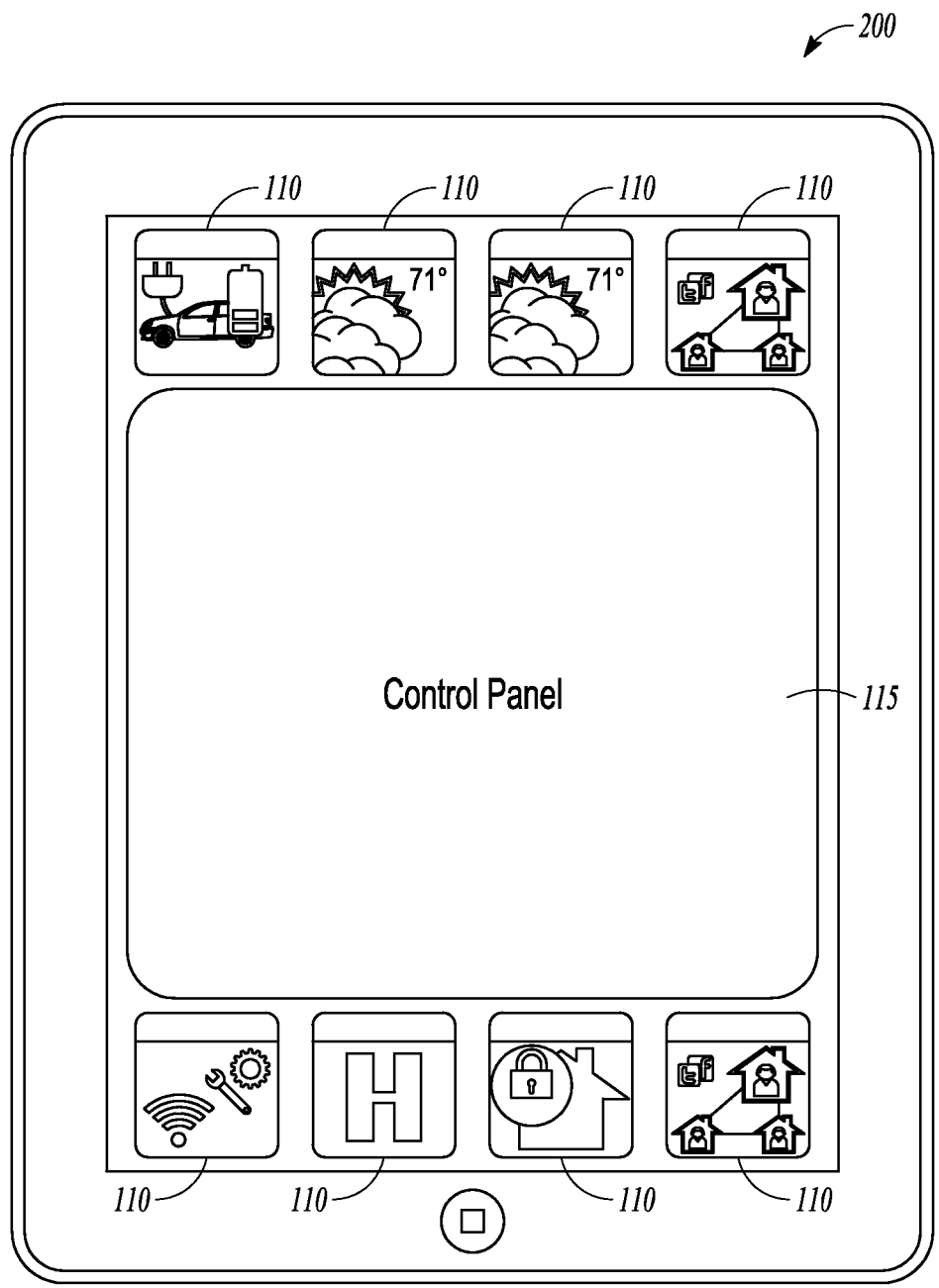
FIG. 2 illustrates a device to provide an alternative interface for a home energy manager showing tiles arranged about a control panel portion of a display according to an example embodiment.

FIG. 2 illustrates a device 200 to provide an alternative interface for a home energy manager showing tiles 110 arranged about a control panel portion of a display according to an example embodiment. The tiles 110 are arranged about the top and bottom of the control panel portion 115.

Figure 3:
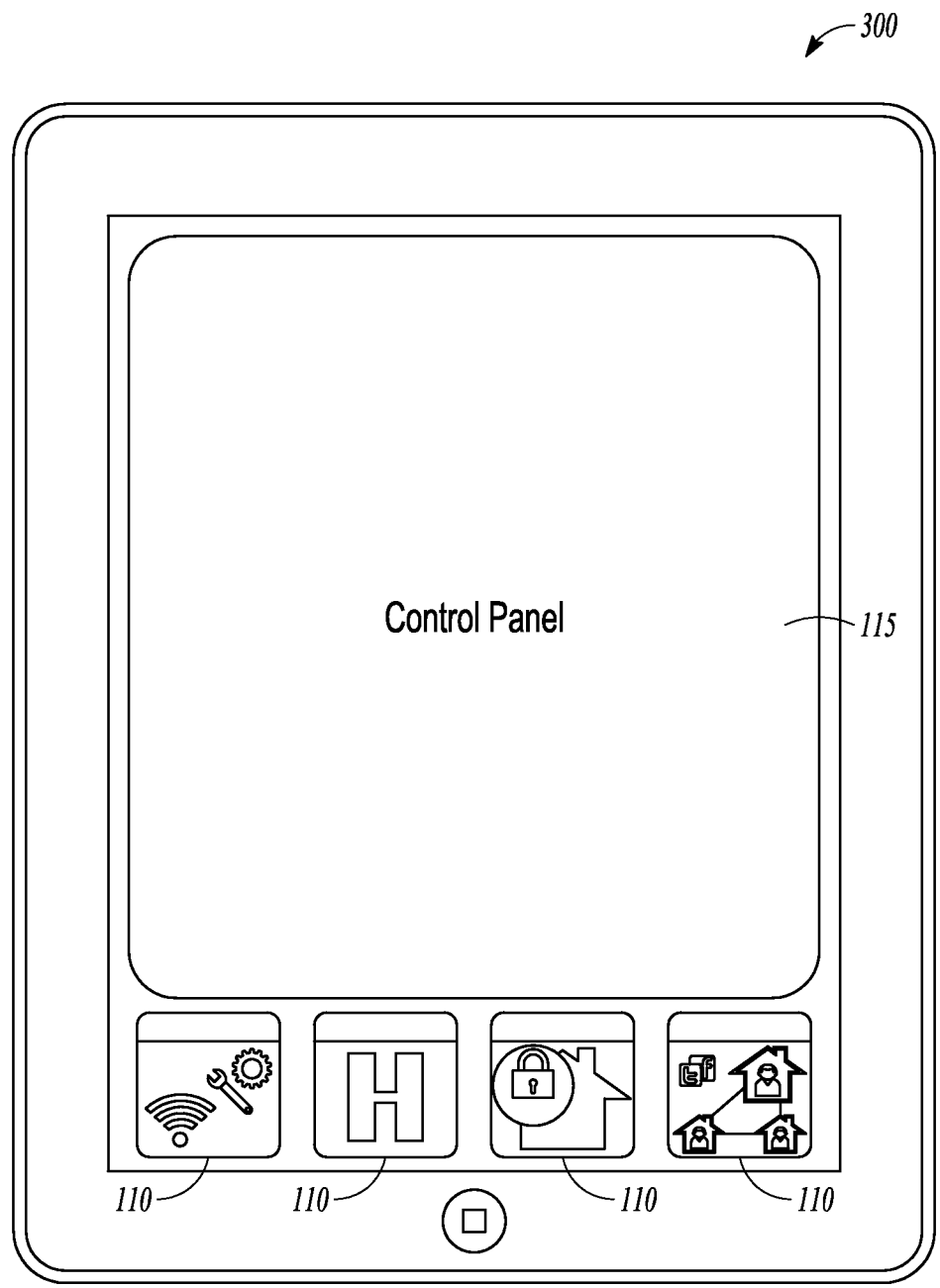
FIG. 3 illustrates a device to provide an alternative interface for a home energy manager showing tiles arranged about a control panel portion of a display according to an example embodiment.

FIG. 3 illustrates a device 300 to provide an alternative interface for a home energy manager showing tiles 110 arranged beneath a control panel portion 115 of a display according to an example embodiment.

Figure 4:
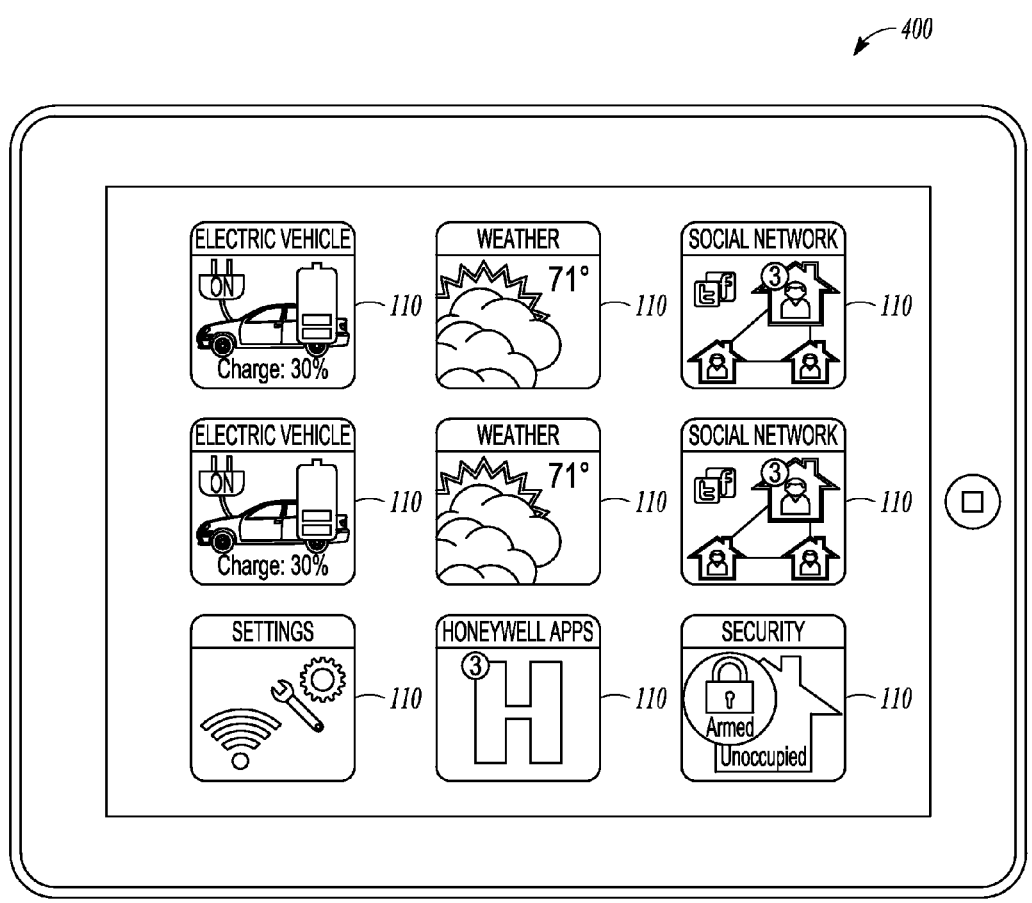
FIG. 4 illustrates a device to provide an alternative interface for a home energy manager showing tiles arranged about a display according to an example embodiment.

FIG. 4 illustrates a device 400 to provide an alternative interface for a home energy manager showing tiles arranged on a display according to an example embodiment. In prior embodiments, the devices are oriented in a portrait mode. Device 400 is shown in a landscape mode. Rotation of the devices may result in the mode changing with each different orientation to remain readable by a user.

Figure 5:
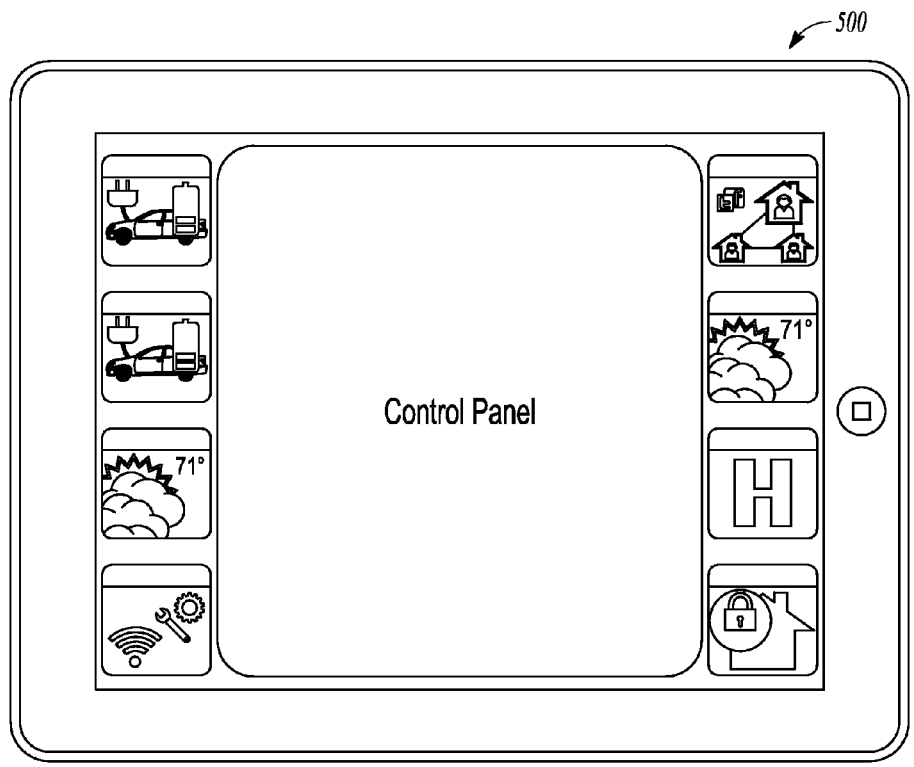
FIG. 5 illustrates a device to provide an alternative interface for a home energy manager showing tiles arranged about a control panel portion of a display according to an example embodiment.

FIG. 5 illustrates a device 500 to provide an alternative interface for a home energy manager showing tiles arranged about a control panel portion of a display in a landscape mode according to an example embodiment.

Figure 6:
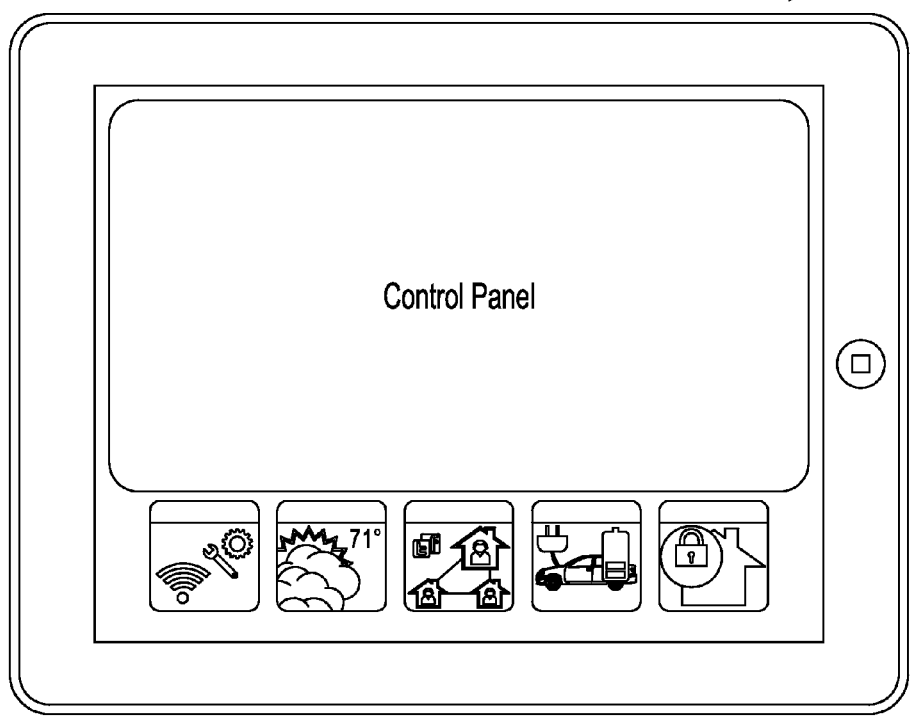
FIG. 6 illustrates a device to provide an alternative interface for a home energy manager showing tiles arranged about a control panel portion of a display according to an example embodiment.

FIG. 6 illustrates a device 600 to provide an alternative interface for a home energy manager showing tiles arranged beneath a control panel portion of a display in a landscape mode according to an example embodiment.

Figure 7:
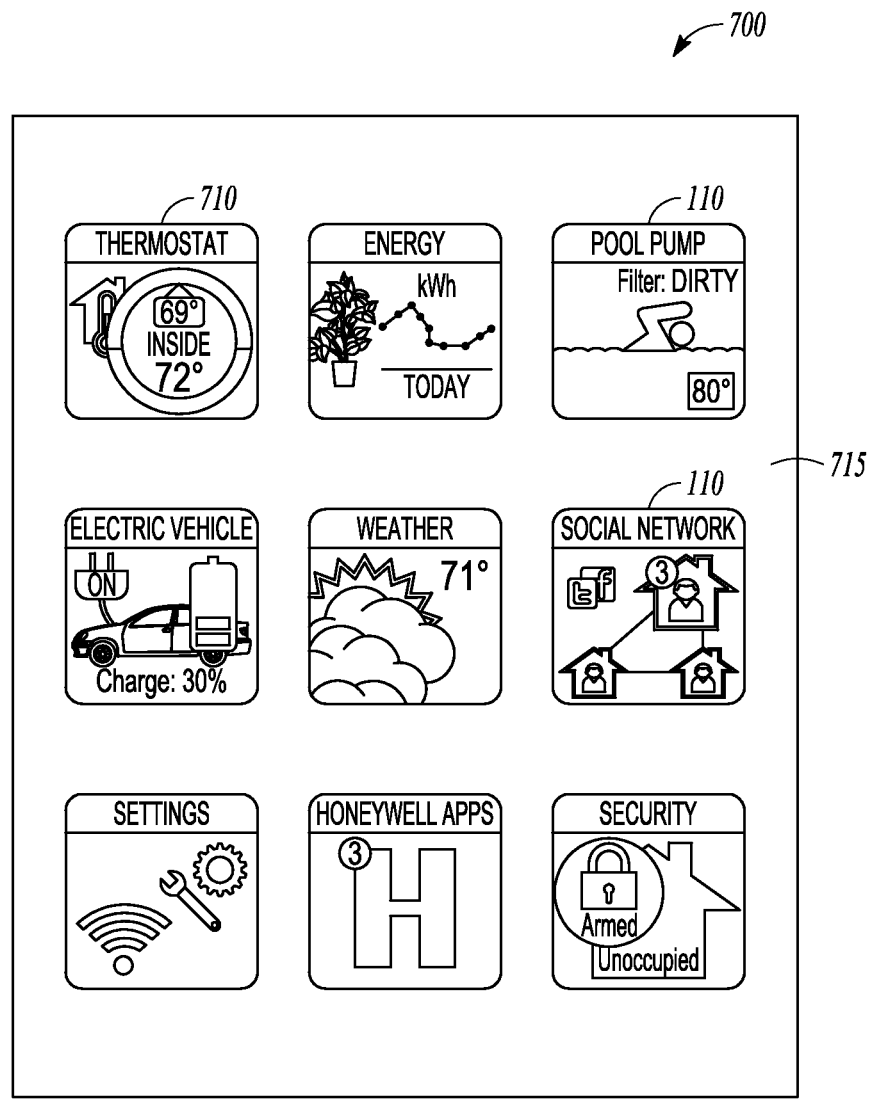
FIG. 7 illustrates a portion of a display to provide an alternative interface for a home energy manager showing multiple tiles arranged about a display in landscape mode according to an example embodiment.

FIG. 7 illustrates a portion of a display 700 to provide an alternative interface for a home energy manager showing multiple tiles 115 on a portion of the display 715 corresponding to smart devices according to an example embodiment. The arrangement of tiles presents an opportunity to make the tiles larger and more clearly display the information within the tiles. A thermostat tile 710 is shown in the upper left corner of the display 700.

Figure 8:
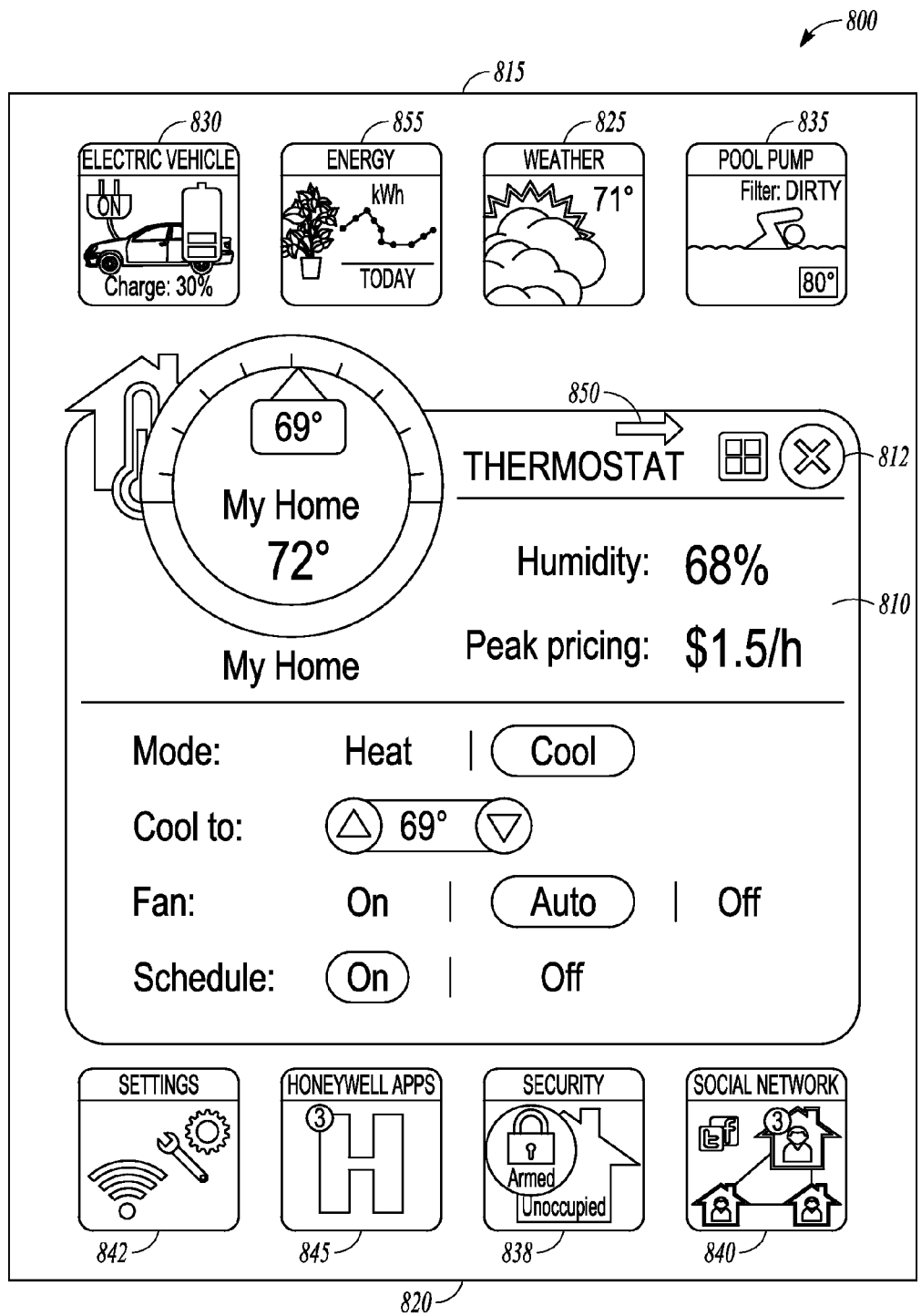
FIG. 8 illustrates a portion of a display to provide an alternative interface for a home energy manager showing further details corresponding to a thermostat represented by a tile in a control panel portion of the display according to an example embodiment.

FIG. 8 illustrates a portion of a display 800 to provide an alternative interface for a home energy manager showing further details, corresponding to a thermostat represented by tile 710, in a display portion of the display according to an example embodiment. The control panel 115 provides additional details of a selected tile. Touching the thermostat tile 710 opens the control panel view 810 to display additional settings associated with the device represented by the touched tile. An "x" is provided at 812 to return the display to minimize the details back into tile 710 Remaining tiles will be docked at the top 815 and bottom 820 in one embodiment to provide relevant information about other devices in the ecosystem for effective decision making. For instance, a weather tile 825 displays the outdoor temperature. An electric vehicle tile 830 displays the state of charge of a vehicle. A pool pump tile 835 displays the water temperature and filter status. Further tiles include a security tile 838, social network 840, settings 842, and other apps 845. This design provides the ability to see other tiles even with an open control panel that shows additional details. Touching a tile at the top or bottom will open a control panel relevant to that tile.

In one embodiment, the details include information relevant to the device being controlled. For instance, view 810 provides the inside temperature and setpoint, humidity, pricing for energy, mode, fan status and control, and a schedule.

An additional information screen may be provided for selected appliances represented by tiles. An icon such as an arrow (→) 850 at the top of the control panel may be used to select a further screen for some tiles that will just display information about the selected tile. This is an advanced screen which will probably be used only once (e.g., setting a schedule for thermostat) by the user.

HTML5 may be used as the coding platform to implement these tiles independent of the operating system. This interface will be available to the user on multiple touch points—portable device (like an iPad™ device), smart phone (like iPhone™ device), wall mounted device, and PC. Touch gestures and buttons may also be used to use the interface. Settings changed via one touch point may update other touch point views. For example, when a change is made from an iPad™ device, these changes will be reflected when later viewed on a personal computer.

Icons have been used on graphical user interfaces for multiple purposes. Icons typically present static pieces of information and are used as hot buttons for navigation. A mechanism is used to display dynamic content on icons that can still be used for navigation purposes. Style sheets may be used to display dynamic information on icons for graphical user interfaces. The style sheets ensure obtaining dynamic information from other systems such as sensors, thermostats, security systems, etc. and display the dynamic information on the icons displayed on a device (such as an iPhone device). The mechanism further ensures the look and feel of the icons is consistent regardless of the platform/device the icon is displayed on (e.g. iPhone, android, blackberry, etc.)

This ecosystem and having a home energy management solution (HEM) devices and interfaces are an integral piece in efficient use of the energy. As part of this drive for efficient use, these interfaces provide users with intuitive, yet effective solutions to drive behavior change.

Since the goal of these interfaces is to provide users with a place to view and manipulate information about home ecosystem devices, they are designed to provide data to the user in a way that is easy to work with. This includes the ability to use the information learned from the ecosystem in order to drive decisions about devices and habits. In one embodiment, a touch-enabled, dashboard-style platform provides relevant information to the user in a manner which allows for easy understanding and manipulation of associated devices and services to enable and sustain efficient energy usage behavior.

In one embodiment, each device or information source associated with the platform has its own unique "tile", which will be identified by an intuitive icon and descriptive label. Tiles come in multiple sizes (e.g. thumbnail, control panel). The thumbnails are interactive elements which may be used to navigate to corresponding control panels when they are touched, clicked, or otherwise selected.

Thumbnail views in the form of tiles display information about the associated device. Thumbnails display information about particular devices in real time. For example, the thumbnail portion of an electric vehicle "tile" would display dynamic information about the status of the vehicle's battery level (e.g. graphical battery indicator), percent remaining on a charge (e.g. "30%"), and whether the vehicle is currently plugged in (e.g. image of plug with text indication "On"/"Off"). This information changes, dynamically, as the system state of the associated device (electric vehicle is the example given above, but many other devices also offer real-time data). This dynamic information is available to the user without the user having to perform any type of interaction with the interface—this provides a "dashboard" quality to the platform.

Control panel views display self-composing information based on the associated devices and information provided by these devices. This information is automatically composed and displayed. Human factors principles may be used as a foundation for determining which types of information to dynamically display and how/where this information should be displayed. This information is valuable in helping to provide an interface which is intuitive and easy to use. This foundation also allows for prototyping and gathering voice of customer feedback. Prototypes may be constructed using tools such as Microsoft PowerPoint™ and use to obtain feedback. Final versions of interfaces may be constructed using tools such as HTML5 and Style Sheets. The platform may be used across various consumer devices (smart phones, tablets, PCs, HEM devices, etc.).

Touch gestures and buttons may be used to interact with the interface in some embodiments, such as modify settings, move tiles to preferred locations, etc.

Figure 9:
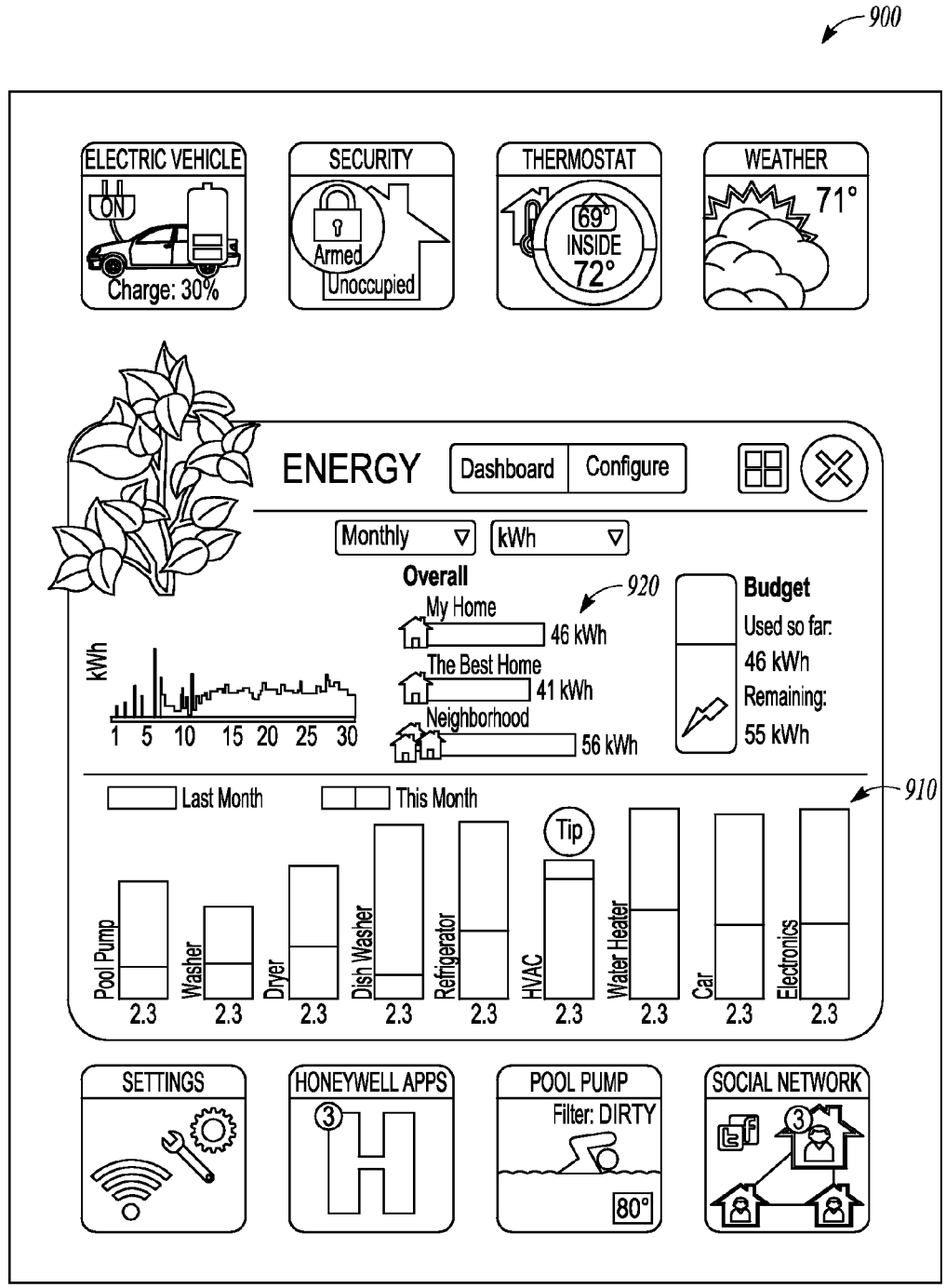
FIG. 9 illustrates a portion of a screen to provide an alternative interface for an energy usage panel of a home energy manager according to an example embodiment.

FIG. 9 illustrates a portion of a screen 900 to provide an alternative interface for an energy usage panel of a home energy manager according to an example embodiment. Screen 900 shows further details associated with an energy tile 855 as illustrated in FIG. 8. Screen 900 provides information to help a user see an overview of their energy consumption in a bar chart 910, as well as compare their use to that of neighbors 920. The type of information shown is only an example, and many different data points may be utilized to provide the user with details about their energy consumption. For example, a status tile may lead to a control panel that provides tips and recommendations to help make conscious energy saving decisions. Users can choose to receive certain kinds of tips/recommendations over others. Also, users can set how certain tips/recommendation are executed or implemented, such as manual vs. automated vs. semi-automated.

Figure 10:
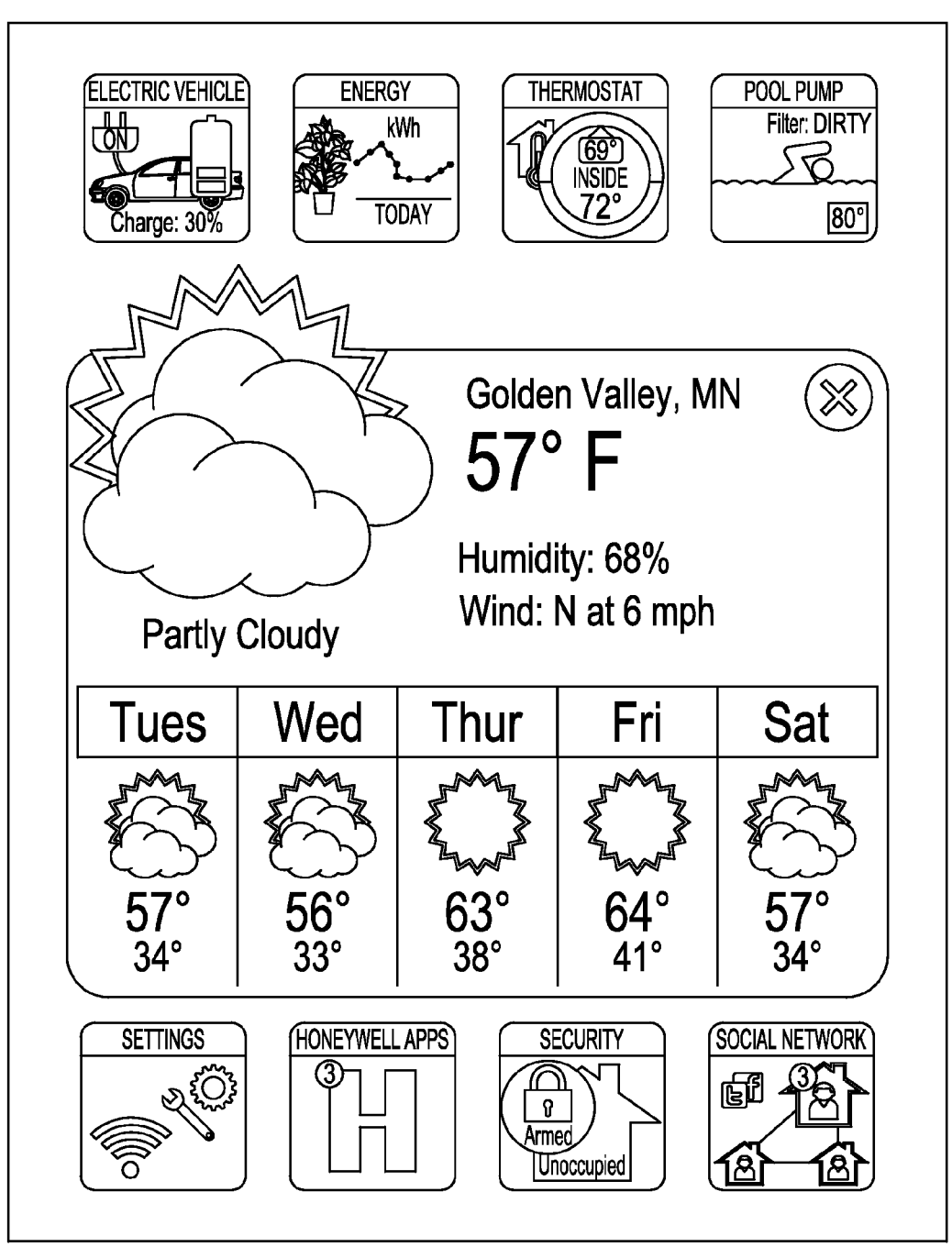
FIG. 10 illustrates a portion of a screen to provide an alternative interface for an external weather panel of a home energy manager according to an example embodiment.

FIG. 10 illustrates a portion of a screen 1000 to provide an alternative interface for an external weather panel of a home energy manager according to an example embodiment. Upon selecting the weather tile 825, screen 1000 is presented to the user and includes a weather summary, including a forecast in some embodiments.

Figure 11:
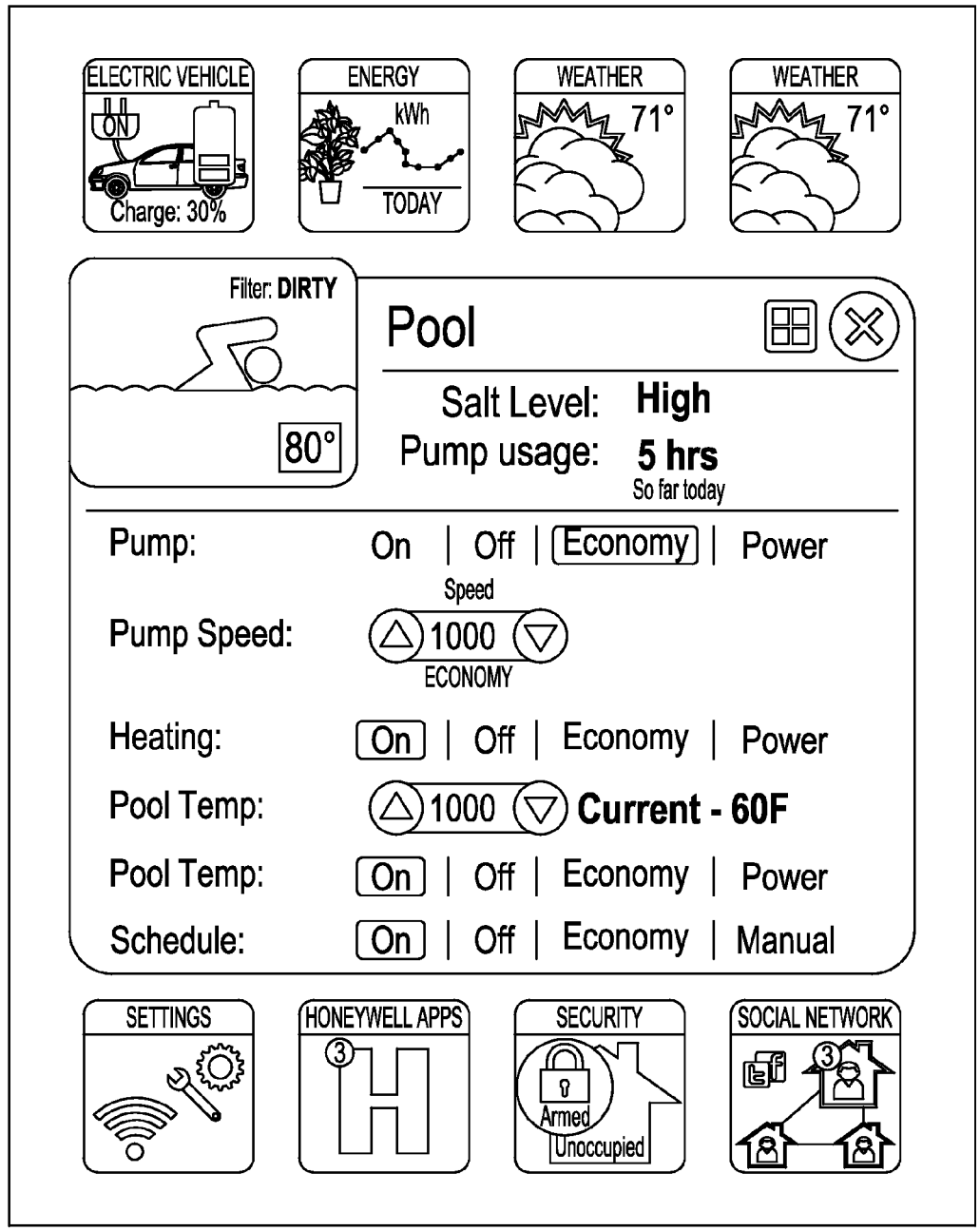
FIG. 11 illustrates a portion of a screen to provide an alternative interface for a pool controller of a home energy manager according to an example embodiment.

FIG. 11 illustrates a portion of a screen 1100 to provide an alternative interface for a pool controller of a home energy manager according to an example embodiment. Upon selecting the pool pump tiles 835, the user is provided further information regarding the state of the pool, including pool salt level, temperature, pump status and speed, lighting, and scheduling, allowing the user to control the pump and other devices related to the pool.

Figure 12:
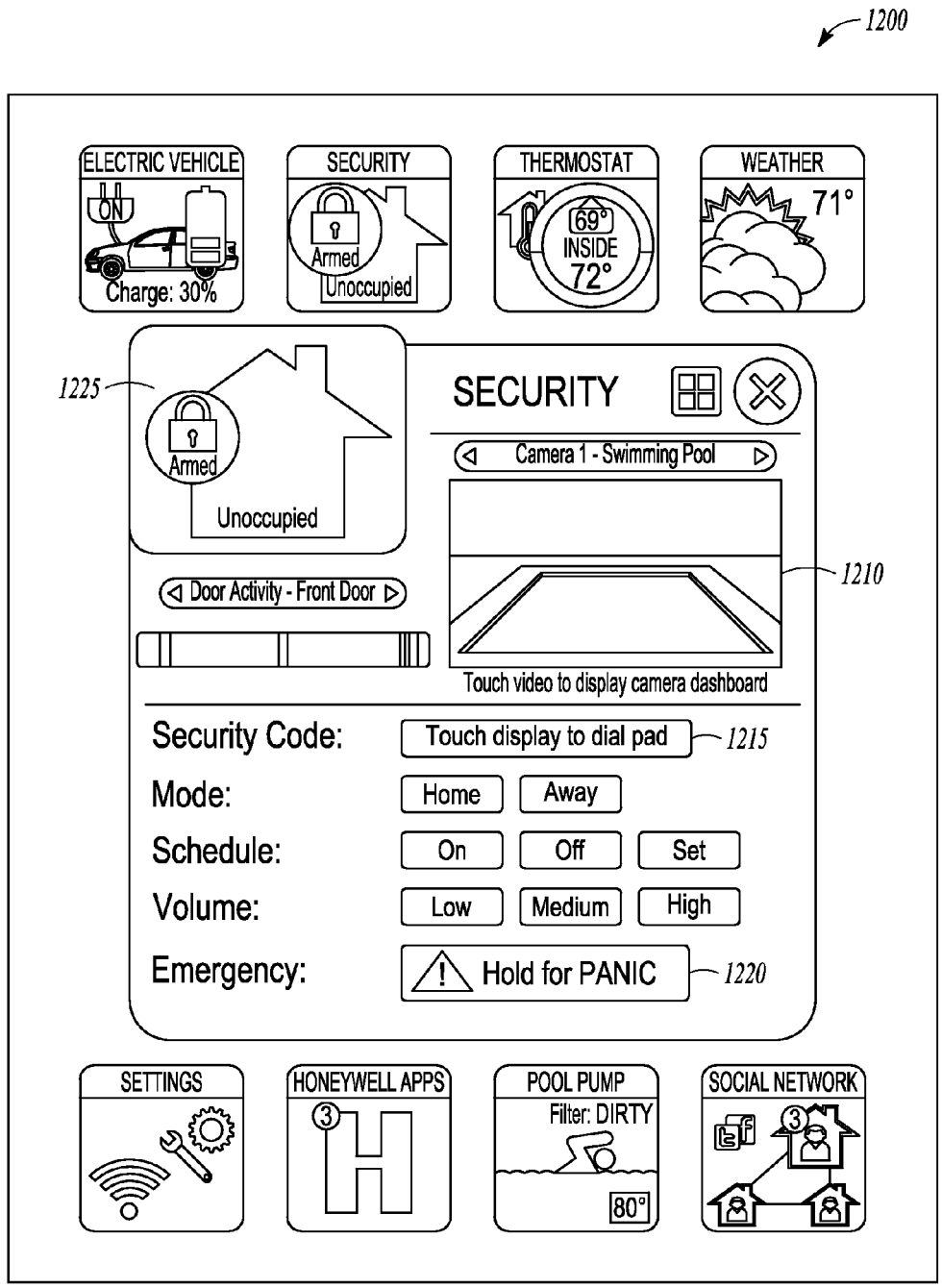
FIG. 12 illustrates a portion of a screen to provide an alternative interface for a security system panel of a home energy manager according to an example embodiment.

FIG. 12 illustrates a portion of a screen 1200 to provide an alternative interface for a security system panel of a home energy manager according to an example embodiment. Upon selecting security tile 838, the user is presented with further details regarding a user's security system, including for example, images from a camera 1210, security code entry button 1215, mode, schedule, volume, and a panic button 1220. A status may also be displayed as indicated at 1225.

Figure 13:
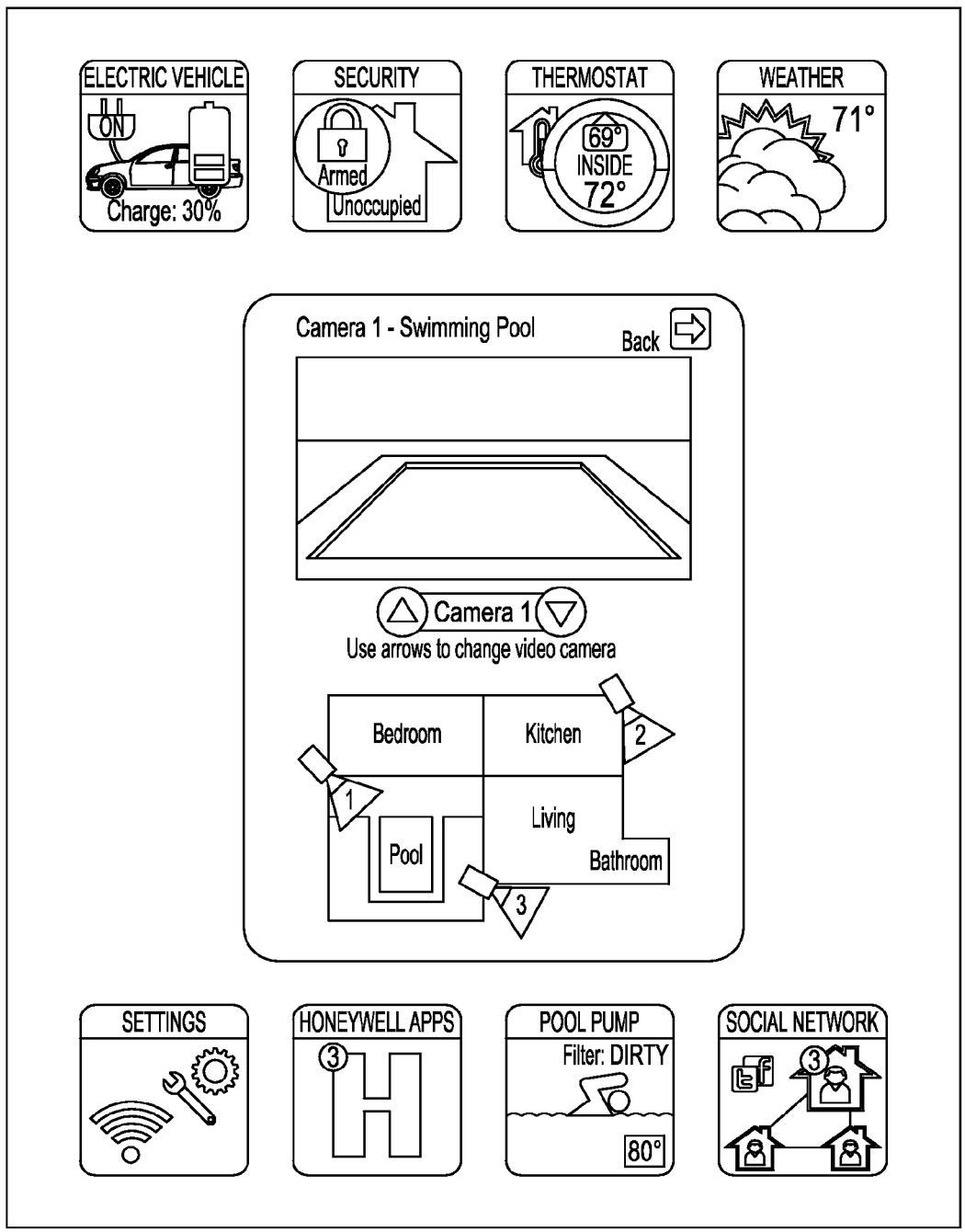
FIG. 13 illustrates a portion of a screen to provide an alternative interface for managing cameras as part of a security system panel of a home energy manager according to an example embodiment.

FIG. 13 illustrates a portion of a screen 1300 to provide an alternative interface for managing cameras as part of a security system panel of a home energy manager according to an example embodiment. Selection of the camera 1210 section provides a dashboard view in screen 1300 to provide information about camera placement, and selection of camera views.

Figure 14:
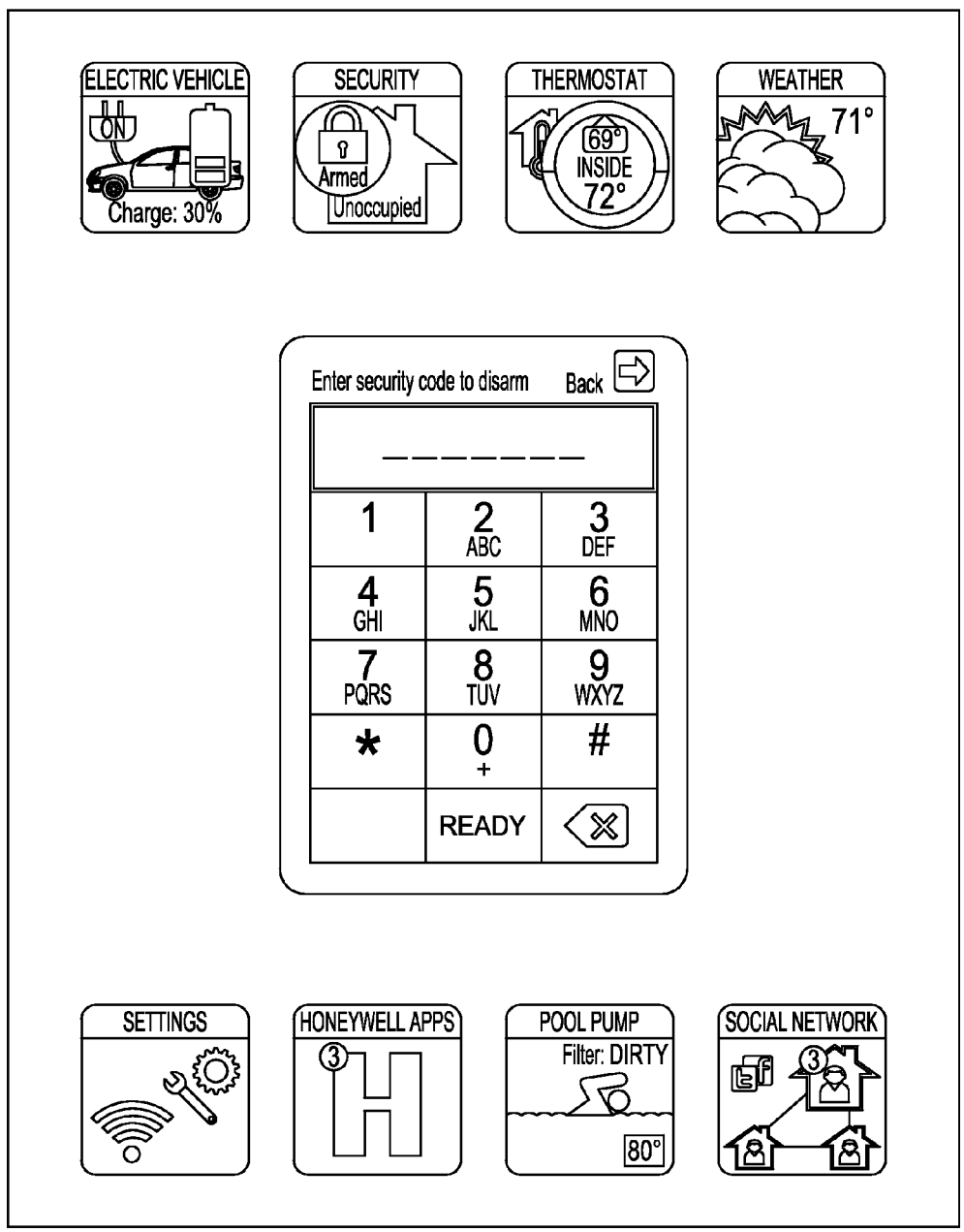
FIG. 14 illustrates a portion of a screen to provide an alternative interface for entry of a security code in a control panel portion according to an example embodiment.

FIG. 14 illustrates a portion of a screen 1400 to provide an alternative interface for entry of a security code in a control panel portion according to an example embodiment. A keypad 1410 is provided to enter a security code upon selection of the security code button 1215.

Figure 15:
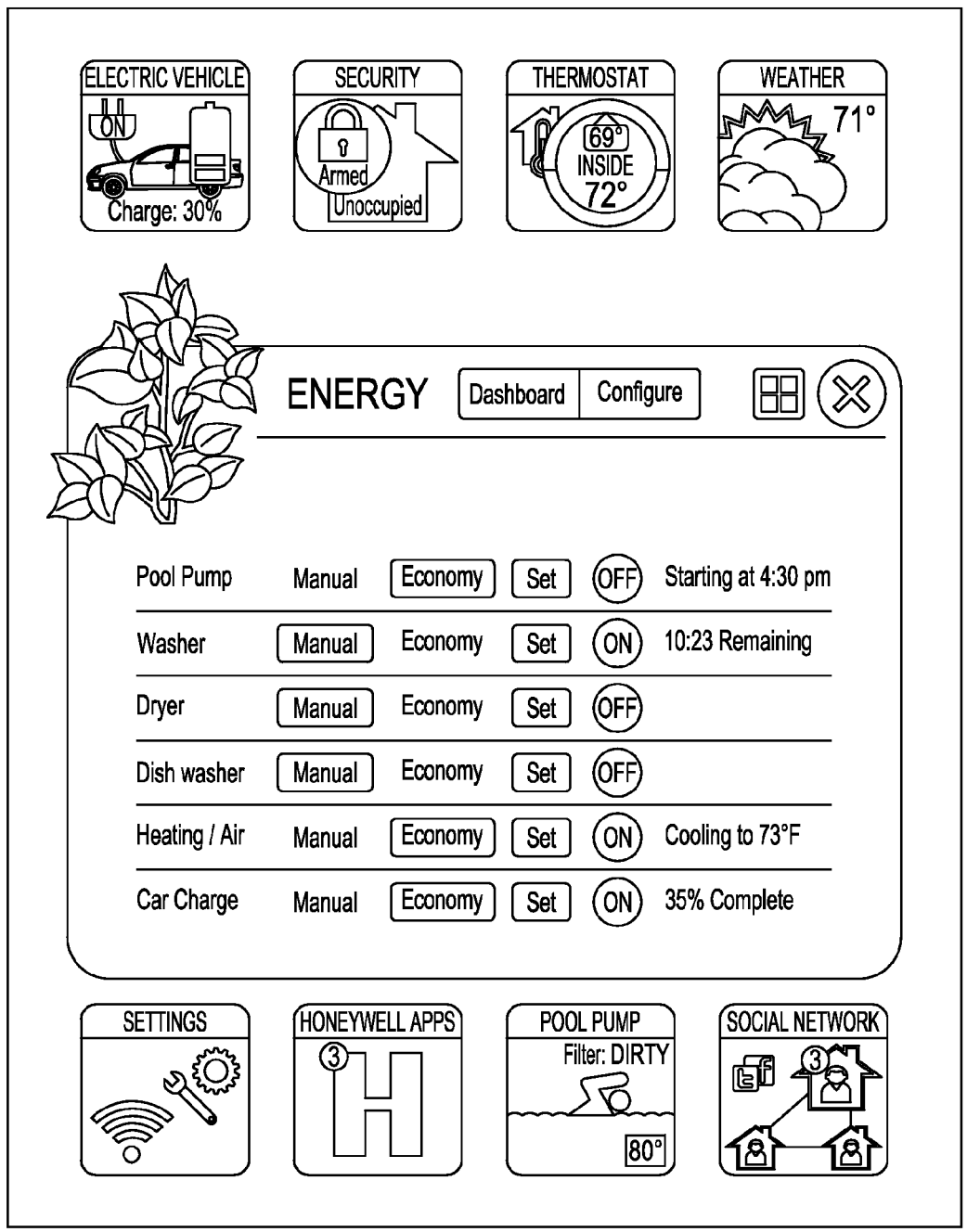
FIG. 15 illustrates a portion of a screen to provide an alternative interface for multiple devices in a list format for a home energy manager according to an example embodiment.

FIG. 15 illustrates a portion of a screen 1500 to provide an alternative interface for multiple devices in a list format for a home energy manager according to an example embodiment. Appliances being controlled in the home are provided in a list setting with the ability to select manual and economy modes for example, as well as scheduling of the modes.

Figure 16:
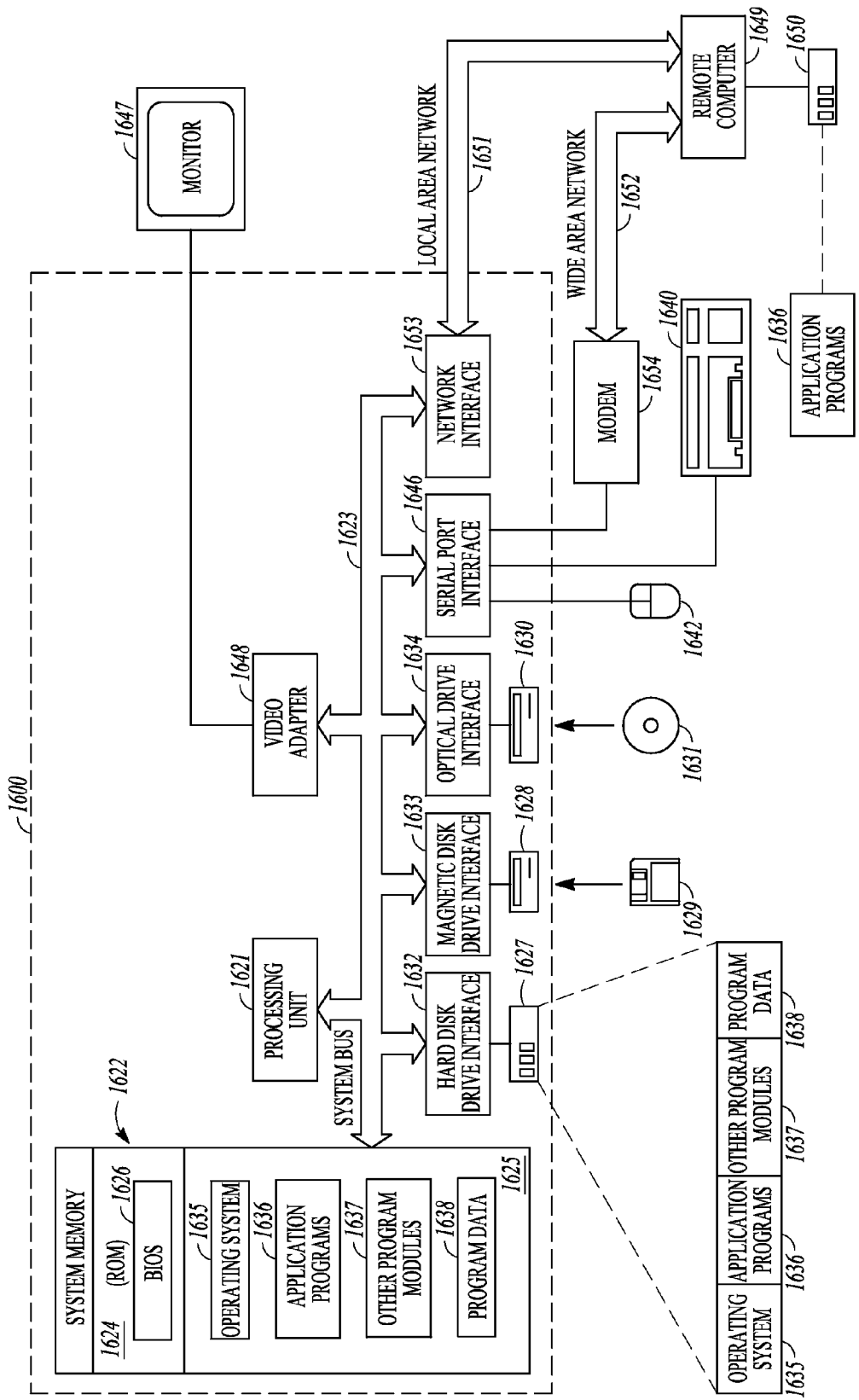
FIG. 16 is a block diagram of a computer architecture illustrating components that may be used to fabricate a portable device according to an example embodiment.

FIG. 16 is a block diagram of a computer architecture illustrating components that may be used to fabricate a portable device according to an example embodiment. In the embodiment shown in FIG. 16, a hardware and operating environment is provided that is applicable to any of the devices and a home energy controller to receive signals from the user interface devices and communicate and control the appliances that the tiles represent. Implementation of the user devices may likely utilize fewer of the components that shown, but basically include one or more processors, memory devices, touch screen controllers, touch screen displays and other constructs normally associated with mobile devices.

As shown in FIG. 16, one embodiment of the hardware and operating environment includes a general purpose computing device in the form of a computer 1600 (e.g., a personal computer, workstation, or server), including one or more processing units 1621, a system memory 1622, and a system bus 1623 that operatively couples various system components including the system memory 1622 to the processing unit 1621. There may be only one or there may be more than one processing unit 1621, such that the processor of computer 1600 comprises a single central-processing unit (CPU), or a plurality of processing units, commonly referred to as a multiprocessor or parallel-processor environment. In various embodiments, computer 1600 is a conventional computer, a distributed computer, or any other type of computer.

The system bus 1623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 1624 and random-access memory (RAM) 1625. A basic input/output system (BIOS)

program 1626, containing the basic routines that help to transfer information between elements within the computer 1600, such as during start-up, may be stored in ROM 1624. The computer 1600 further includes a hard disk drive 1627 for reading from and writing to a hard disk, not shown, a magnetic disk drive 1628 for reading from or writing to a removable magnetic disk 1629, and an optical disk drive 1630 for reading from or writing to a removable optical disk 1631 such as a CD ROM or other optical media.

The hard disk drive 1627, magnetic disk drive 1628, and optical disk drive 1630 couple with a hard disk drive interface 1632, a magnetic disk drive interface 1633, and an optical disk drive interface 1634, respectively. The drives and their associated computer-readable media provide non volatile storage of computer-readable instructions, data structures, program modules and other data for the computer 1600. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 1629, optical disk 1631, ROM 1624, or RAM 1625, including an operating system 1635, one or more application programs 1636, other program modules 1637, and program data 1638. Programming for implementing one or more processes or method described herein may be resident on any one or number of these computer-readable media.

A user may enter commands and information into computer 1600 through input devices such as a keyboard 1640 and pointing device 1642. Other input devices (not shown) can include a microphone, joystick, game pad, satellite dish, scanner, or the like. These other input devices are often connected to the processing unit 1621 through a serial port interface 1646 that is coupled to the system bus 1623, but can be connected by other interfaces, such as a parallel port, game port, or a universal serial bus (USB). A monitor 1647 or other type of display device can also be connected to the system bus 1623 via an interface, such as a video adapter 1648. The monitor 1647 can display a graphical user interface for the user. In addition to the monitor 1647, computers typically include other peripheral output devices (not shown), such as speakers and printers.

The computer 1600 may operate in a networked environment using logical connections to one or more remote computers or servers, such as remote computer 1649. These logical connections are achieved by a communication device coupled to or a part of the computer 1600; the invention is not limited to a particular type of communications device. The remote computer 1649 can be another computer, a server, a router, a network PC, a client, a peer device or other common network node, and typically includes many or all of the elements described above 110 relative to the computer 1600, although only a memory storage device 1650 has been illustrated. The logical connections depicted in FIG. 16 include a local area network (LAN) 1651 and/or a wide area network (WAN) 1652. Such networking environments are commonplace in office networks, enterprise-wide computer networks, intranets and the internet, which are all types of networks.

When used in a LAN-networking environment, the computer 1600 is connected to the LAN 1651 through a network interface or adapter 1653, which is one type of communications device. In some embodiments, when used in a WAN-networking environment, the computer 1600 typically includes a modem 1654 (another type of communications device) or any other type of communications device, e.g., a wireless transceiver, for establishing communications over the wide-area network 1652, such as the internet. The modem 1654, which may be internal or external, is connected to the system bus 1623 via the serial port interface 1646. In a networked environment, program modules depicted relative to the computer 1600 can be stored in the remote memory storage device 1650 of remote computer, or server 1649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

1. A device comprising:
a device manager stored on a computer readable storage device;
a display having multiple tiles corresponding to smart devices installed in a user home having inter-dependent statuses and settings; and
wherein the device manager generates the tiles with corresponding smart device information displayed in the tiles, and selection of a tile provides a view showing details about the smart device while not obscuring unselected tiles.

2. The device of example 1 wherein the display comprises a touch screen.

3. The device of example 1 or 2 wherein the device manager generates a control panel displayed upon selection of a tile, wherein the control panel provides the view and includes selectable settings.

4. The device of example 3 wherein the device manager places other tiles outside of the control panel such that smart device information in such tiles is visible while a user interacts with the control panel.

5. The device of any of examples 1-4 wherein the tiles comprise dynamic information and navigation constructs for displaying further information.

6. The device of example 5 wherein the tiles are arranged the same regardless of the type of display.

7. The device of any of examples 1-6 wherein the device manager received dynamic information regarding the smart devices and displays the received dynamic information in the tiles.

8. The device of any of examples 1-7 wherein the device manager further comprises a network connector to communicate wirelessly with the smart devices.

9. The device of any of examples 1-8 wherein at least one tile contains a recommendation for energy management.

10. The device of any of examples 1-9 wherein at least one tile contains status information not directly associated with a smart device.

11. A method comprising:
receiving dynamic information regarding the status of multiple smart devices installed in a home;
displaying on a display device, a tile for each of the multiple smart devices showing the dynamic information, wherein each tile is selectable to generate display of a control panel on the display device.

12. The method of example 11 wherein the display device is a touchscreen facilitating selection of the tile by touch to display the control panel.

13. The method of example 12 and further comprising moving tiles for multiple smart devices when a control panel is displayed such that information on the tiles is visible on the display device.

14. The method of any of examples 11-13 wherein displaying on a display device results in the same display of tiles and control panel regardless of the type of display device.

15. The method of any of examples 11-14 and further comprising displaying a tile representing energy management tips generated as a function of the dynamic information.

16. The method of example 15 and further comprising implementing an energy management tip responsive to user selection of a tip implementation preference.

17. The method of example 16 wherein the tip implementation preference is selected from manual, automated, and semi-automated.

18. A computer readable storage device having instructions for causing a computer to implement a method, the method comprising:
receiving dynamic information regarding the status of multiple smart devices installed in a home;
displaying on a display device, a tile for each of the multiple smart devices showing the dynamic information, wherein each tile is selectable to generate display of a control panel on the display device.

19. The storage device of example 18 wherein the display device is a touchscreen facilitating selection of the tile by touch to display the control panel, and wherein the method further comprises moving tiles for multiple smart devices when a control panel is displayed such that information on the tiles is visible on the display device.

20. The storage device of any of examples 18-19 wherein the method further comprises:
displaying a tile representing energy management tips generated as a function of the dynamic information; and implementing an energy management tip responsive to user selection of a tip implementation preference, wherein the tip implementation preference is selected from manual, automated, and semi-automated.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. An internet-connected device comprising:
a device manager stored on a computer readable storage device;
a touch screen interactive display having multiple tiles corresponding to other internet-connected devices installed in a building, the multiple tiles having interdependent statuses and settings, the multiple tiles providing dynamic information about a status or settings of the corresponding other internet-connected devices and arranged in a non-overlapping manner about a control panel wherein the control panel displays detailed information about, and an interface to control, a selected corresponding internet-connected device corresponding to a user selected tile, wherein the multiple tiles include a weather tile, a thermostat tile, a security tile, and an energy tile; and
wherein the device manager generates the tiles with the corresponding internet-connected device information displayed in the tiles, information of the weather tile including an outdoor temperature, information of the thermostat tile including an indoor temperature, information of the security tile including whether the security system is activated, and information of the energy tile including a graph of energy consumption, and user selection of the user selected tile provides a view in the control panel showing more information including details about the selected corresponding internet-connected device than is provided by the selected tile while not obscuring unselected tiles which are sized to make the dynamic information viewable to the user,
wherein the tiles displayed about the control panel are selected for display of information from corresponding internet-connected devices that is relevant to control of the selected corresponding internet connected device via a setting in the control panel.

2. The device of claim 1 wherein the view in the control panel includes multiple settings to control the selected corresponding internet connected device, wherein the tiles displayed about the control panel are a subset of available tiles for display, and wherein the selected tile is no longer displayed about the control panel.

3. The device of claim 1 wherein the tiles displayed are tiles that have pertinent information to make changes to the current control panel, wherein the view in the control panel includes an icon to minimize the view back into the selected tile, and wherein the view in the control panel further includes an icon to cause display of a screen that just displays information about the selected tile.

4. The device of claim 1 wherein the tiles displayed are tiles that have been identified by a user for display during viewing of each control panel representation of detailed information corresponding to a selected tile.

5. The device of claim 1 wherein the tiles comprise dynamic information regarding the corresponding internet-connected devices and navigation constructs for displaying further information.

6. The device of claim 5 wherein the tiles are arranged the same regardless of the type of display.

7. The device of claim 1 wherein the device manager receives dynamic information regarding the internet-connected devices and displays the received dynamic information in the tiles.

8. The device of claim 1 wherein the device manager further comprises a network connector to communicate wirelessly with the internet-connected devices, and wherein the detailed information of the security tile includes a view of a camera and user input boxes through which a user can configure a security system including entering a security code, selecting a security mode, setting a security schedule, and a panic button.

9. The device of claim 1 wherein at least one tile contains a recommendation for energy management.

10. The device of claim 1 wherein at least one tile contains status information not directly associated with an internet-connected device.

11. A method performed by an internet-connected device, the method comprising:
receiving dynamic information regarding the status of multiple other corresponding internet-connected devices installed in a building;

displaying, on a touch screen interactive display of the internet-connected device, a tile for each of the multiple other corresponding internet-connected devices showing the dynamic information, wherein each tile provides dynamic information about a status or settings of the corresponding internet-connected device and are arranged in a non-overlapping manner about a control panel wherein the control panel displays detailed information about, and an interface to control, a selected corresponding internet connected device corresponding to a user selected tile, the multiple tiles being sized to provide dynamic information viewable to the user about a status or settings of corresponding internet-connected devices and arranged in a non-overlapping manner about a control panel wherein the control panel displays detailed more information than a tile about, and an interface to control, the user selected tile, wherein the multiple tiles include a weather tile, a thermostat tile, a security tile, and an energy tile, and information of the weather tile including an outdoor temperature, information of the thermostat tile including an indoor temperature, information of the security tile including whether the security system is activated, and information of the energy tile including a graph of energy consumption, wherein the tiles displayed about the control panel are selected for such display as a function of the user selected tile to show information from corresponding internet-connected devices that is relevant to control of the selected corresponding internet-connected device via a setting in the control panel.

12. The method of claim 11 wherein the display device is a touchscreen facilitating selection of the tile by touch to display the control panel.

13. The method of claim 12 and further comprising moving tiles for multiple internet-connected devices when a control panel is displayed such that information on the tiles is visible on the display device.

14. The method of claim 11 wherein displaying on a display device results in the same display of tiles and control panel regardless of the type of display device.

15. The method of claim 11 and further comprising displaying a tile representing energy management tips generated as a function of the dynamic information.

16. The method of claim 15 and further comprising implementing an energy management tip responsive to user selection of a tip implementation preference.

17. The method of claim 16 wherein the tip implementation preference is selected from manual, automated, and semi-automated.

18. A non-transitory computer readable storage device having instructions for causing a computer to implement a method, the method comprising:
   receiving dynamic information regarding the status of multiple other corresponding internet-connected devices installed in a home;
   displaying on a display device, a tile for each of the multiple other corresponding internet-connected devices showing the dynamic information, wherein each tile provides dynamic information about a status or settings of the corresponding internet-connected device and are arranged in a non-overlapping manner about a control panel wherein the control panel displays detailed information about, and an interface to control, a selected corresponding internet connected device corresponding to a user selected tile, the multiple tiles being sized to provide dynamic information viewable to the user about a status or settings of corresponding internet-connected devices and arranged in a non-overlapping manner about a control panel wherein the control panel displays detailed more information than a tile about, and an interface to control, the user selected tile,
   wherein the tiles displayed about the control panel are selected for such display as a function of the user selected tile to show information from corresponding internet connected devices that is relevant to control of the selected corresponding internet-connected device via a setting in the control panel.

19. The storage device of claim 18 wherein the display device is a touchscreen facilitating selection of the tile by touch to display the control panel, and wherein the method further comprises moving tiles for multiple internet-connected devices when a control panel is displayed such that information on the tiles is visible on the display device.

20. The storage device of claim 18 wherein the multiple tiles include a weather tile, a thermostat tile, a security tile, and an energy tile, and information of the weather tile including an outdoor temperature, information of the thermostat tile including an indoor temperature, and information of the energy tile including a graph of energy consumption, and wherein the method further comprises:
   displaying a tile representing energy management tips generated as a function of the dynamic information; and
   implementing an energy management tip responsive to user selection of a tip implementation preference, wherein the tip implementation preference is selected from manual, automated, and semi-automated.

* * * * *